J. H. WAGENHORST.
VEHICLE WHEEL RIM.
APPLICATION FILED MAY 20, 1911.
1,177,457.
Patented Mar. 28, 1916
3 SHEETS—SHEET 1.
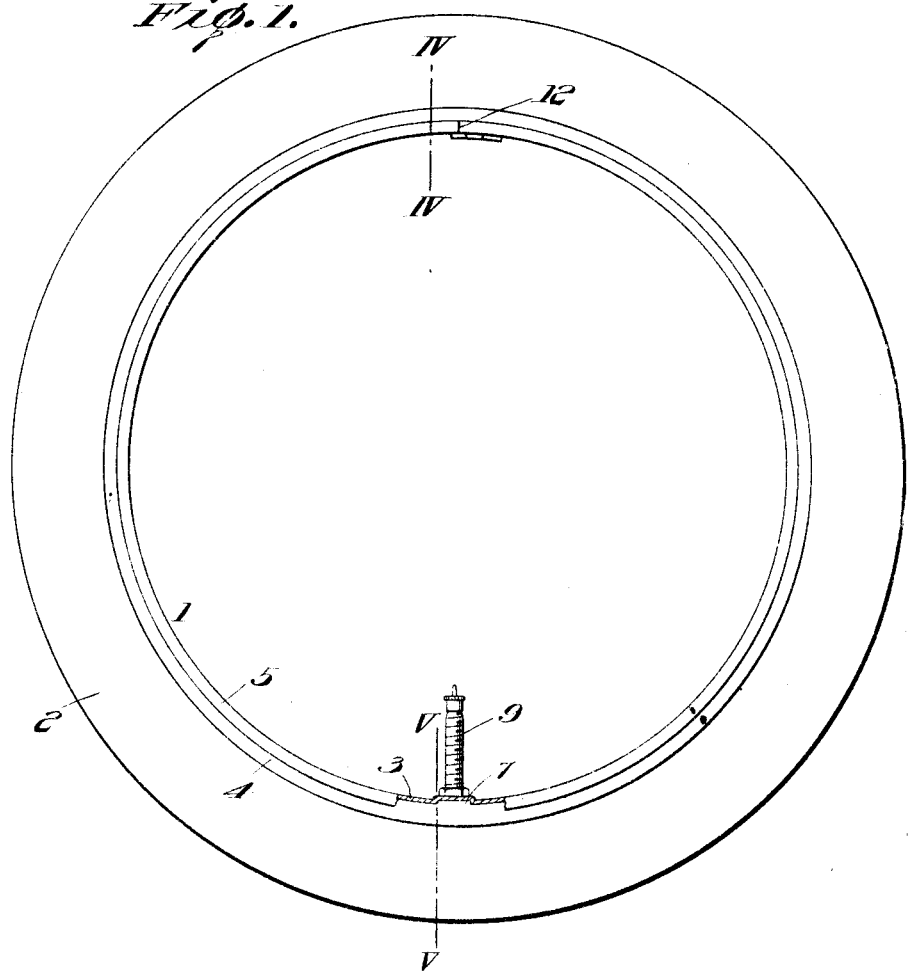
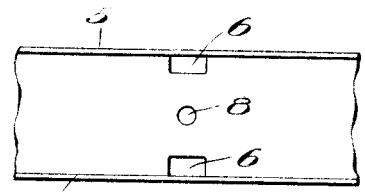
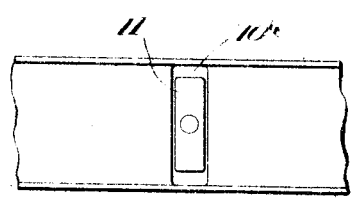
Witnesses:
G. E. Terwilliger
Edmund Quincy Moses
James H. Wagenhorst, Inventor
By his Attorney Seward Davis J. H. WAGENHORST.
VEHICLE WHEEL RIM.
APPLICATION FILED MAY 20, 1911.
1,177,457.
Patented Mar. 28, 1916.
3 SHEETS—SHEET 2.
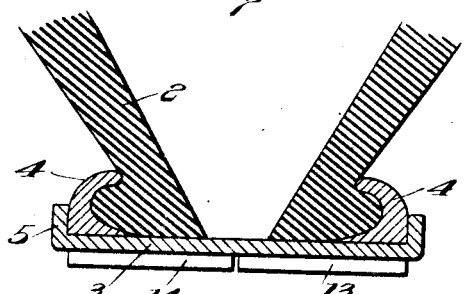
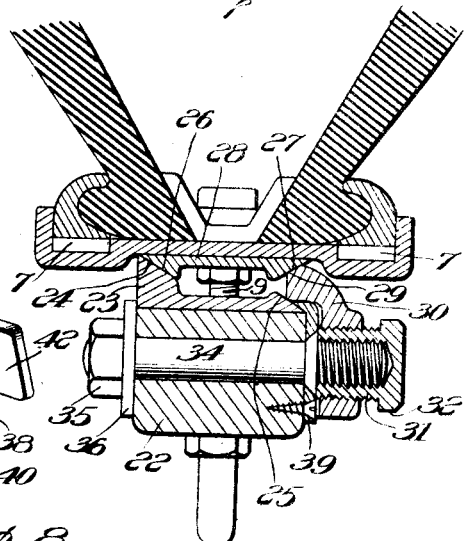
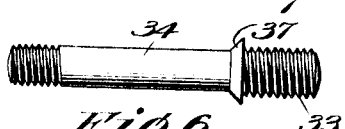
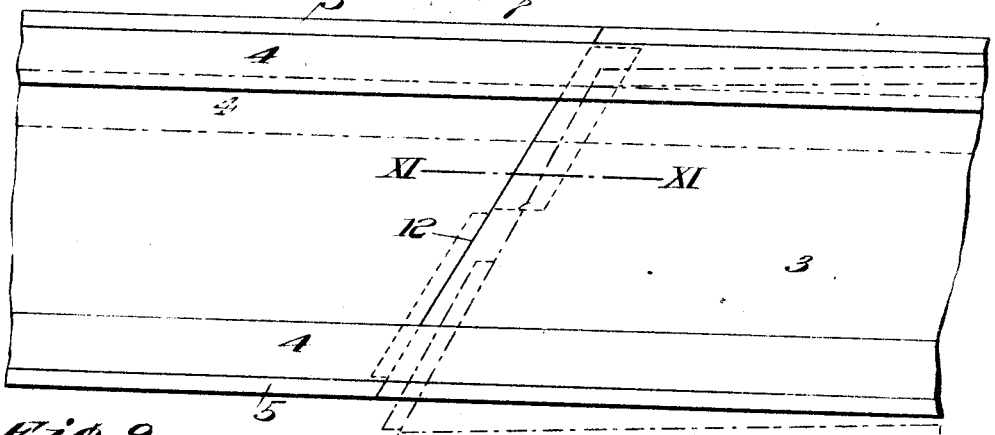
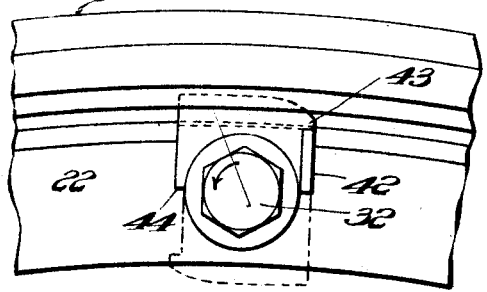
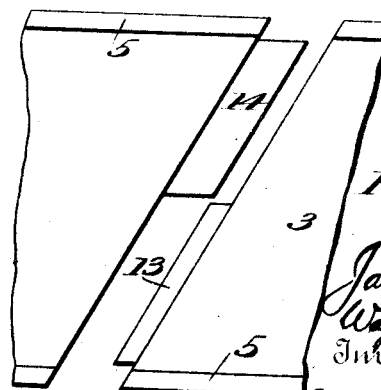
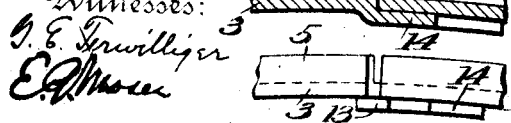
James H. Wagenhorst
Inventor
By his Attorney
Seward Davis
Witnesses:

J. H. WAGENHORST.
VEHICLE WHEEL RIM.
APPLICATION FILED MAY 20, 1911.

1 77,457.

Patented Mar. 28, 1916.
3 SHEETS—SHEET 3.

Witnesses:
G. E. Terwilliger
Edmund ...

James H. Wagenhorst Inventor
By his Attorney
Seward Davis

UNITED STATES PATENT OFFICE.

JAMES H. WAGENHORST, OF AKRON, OHIO, ASSIGNOR, BY MESNE ASSIGNMENTS, OF TWO-FIFTHS TO THE B. F. GOODRICH COMPANY, OF NEW YORK, N. Y., A CORPORATION OF NEW YORK, ONE-FIFTH TO THE GOODYEAR TIRE & RUBBER COMPANY, OF AKRON, OHIO, A CORPORATION OF OHIO, AND ONE-FIFTH TO THE UNITED STATES TIRE COMPANY, OF NEW YORK, N. Y., A CORPORATION OF NEW YORK.

VEHICLE-WHEEL RIM.

1,177,457. Specification of Letters Patent. Patented Mar. 28, 1916.

Application filed May 20, 1911. Serial No. 628,386.

*To all whom it may concern:*

Be it known that I, JAMES H. WAGENHORST, a citizen of the United States, residing in the city of Akron, county of Summit, and State of Ohio, have invented certain new and useful Improvements in Vehicle-Wheel Rims, of which the following is a specification.

My invention relates to vehicle wheel rims of the type designed to carry pneumatic or other resilient tires and comprises improvements in the structure of the rim proper to facilitate the application and removal of the resilient tire.

It also comprises improvements in means for removably securing the rim proper, carrying the tire, upon the wheel.

It also comprises certain improvements in details of structure, as will more fully appear hereafter.

Figure 13:
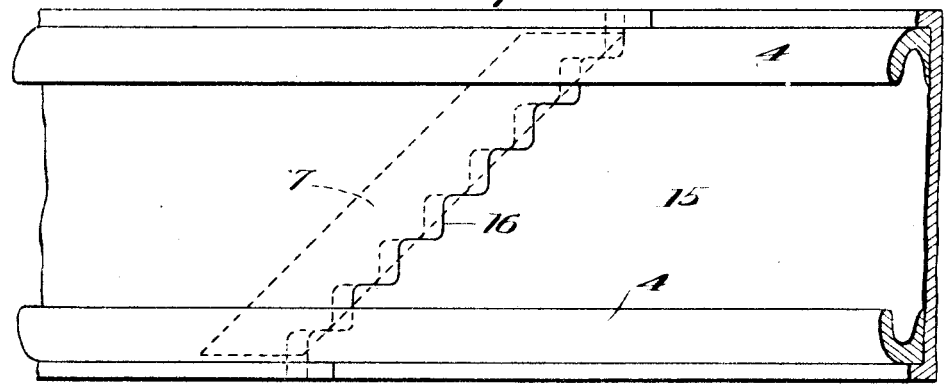
Figure 14:
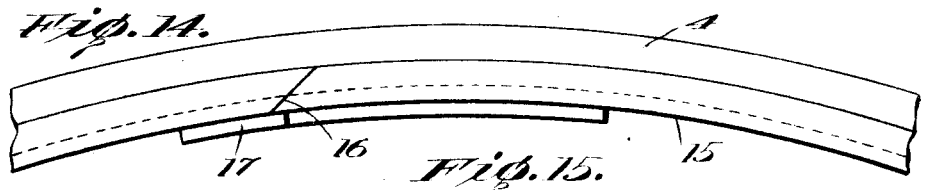
Figure 15:
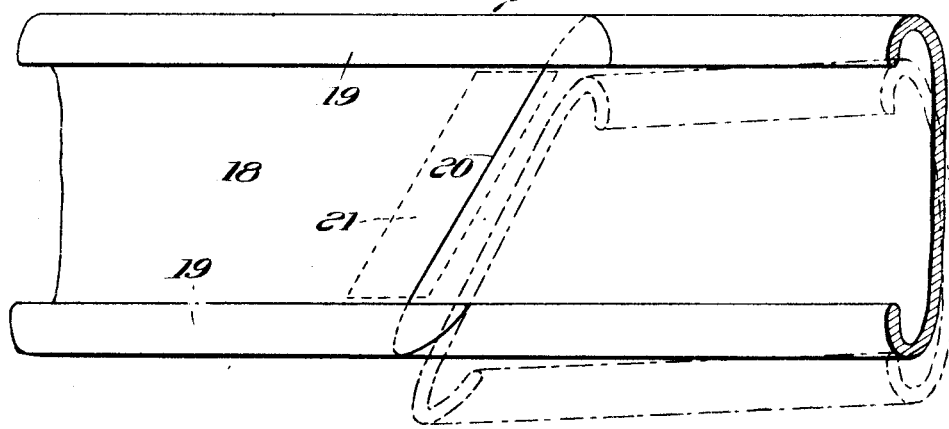
Figure 16:
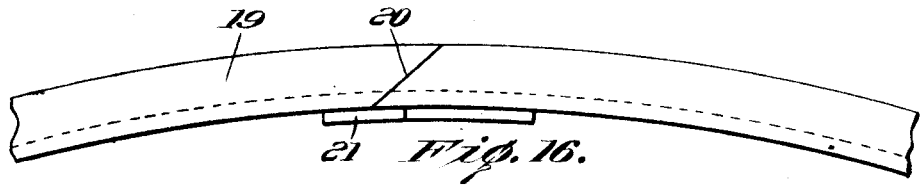

In the accompanying drawings which form a part of this specification, Figure 1 is a side elevation of a tire-carrying rim embodying one form of my invention having a tire mounted thereon, a portion of one of the flanges of the rim base being shown as broken away; Fig. 2 is a plan view of a portion of the rim base; Fig. 3 is a view similar to Fig. 2, illustrating a slightly modified structure; Fig. 4 is a section through the rim base, tire-retaining flanges and base of tire taken on line IV—IV of Fig. 1, the parts being shown on an enlarged scale; Fig. 5 is a view similar to Fig. 4, the section through the rim being taken on line V—V of Fig. 1, this view also showing the felly and felly band of the wheel in section, illustrating my improved form of locking device for securing the rim upon the felly; Fig. 6 is a detail side elevation of the bolt forming a part of the locking device shown in Fig. 5; Fig. 7 is a perspective view of the washer forming a part of said locking means; Fig. 8 is a plan view of the tire-carrying rim showing the means for connecting the ends of the split rim base, the position of the parts when the ends of the latter are disconnected being illustrated in dotted lines; Fig. 9 is a side elevation of the rim and felly and of the locking means shown in Fig. 5; Fig. 10 is a plan view showing the ends of the split rim base slightly separated; Fig. 11 is a section through the rim base on line XI—XI of Fig. 8; Fig. 12 is a side elevation of the rim base at its point of severance; Fig. 13 is a plan view of a portion of a tire-carrying rim similar to the rim shown in Fig. 8, but illustrating a modified form of joint therein; Fig. 14 is a side elevation of the parts shown in Fig. 13; Fig. 15 is a plan view similar to Fig. 8, illustrating a modified form of rim; Fig. 16 is a side elevation of a portion of the rim shown in Fig. 15.

In the drawings forming a part of this specification I have illustrated certain preferred embodiments of my invention, and I will in this specification describe the same in detail in order that my invention may be fully understood. I do not, however, wish to limit my invention to the exact structures shown and described, as these structures are intended merely as illustrative of the many forms in which the principle of my invention may be embodied.

Referring to the drawings in detail and particularly to Figs. 1 to 12, inclusive, the numeral 1 designates a tire-carrying rim adapted to carry a pneumatic or other resilient tire 2, this rim preferably comprising a transversely split band or rim base 3 carrying annular, preferably endless, tire-retaining flanges 4. For holding the tire-retaining flanges upon the rim base the latter is preferably provided at each edge with an upturned flange 5. In order to prevent circumferential movement or creeping of the flanges 4 upon the rim base, I preferably provide interlocking means such, for example, as that shown in Figs. 1, 2 and 5, or in Fig. 3. As shown in Figs. 1, 2 and 5, the rim base has formed in it, preferably by offsetting the metal thereof, a pair of recesses or pockets 6, which receive projections 7 formed on the under-surfaces of the tire-retaining flanges. These recesses or pockets are preferably formed in the rim base adjacent to the perforations 8 therein, through which the valve-stem 9 of the tire is adapted to be passed. As will be understood, the means for preventing the creeping of the flanges may be modified in various ways; for example, as shown in Fig. 3, instead of a pair of depressions 6, a single depression 10 extending entirely across the rim base may be formed in the latter for the reception of the projections or lugs 7, this depression being separated into two pockets by means of a block 11 secured therein or attached to the valve-stem.

To facilitate the application of the tire to the rim, or its removal therefrom, I divide the rim base 3 transversely, as indicated at 12. The rim base is thus capable of being contracted in diameter by having its ends lapped by each other, and may thus be freed from the retaining flanges 4 and removed from the base of the tire. In the form of my invention shown in Figs. 1, 4, 5, 8, 10, 11 and 12, I have shown improved means for securing the ends of the rim base together, these means constituting an important part of the present invention. In the embodiment shown in these figures, one end of the rim base is provided with a narrow projecting lip 13, offset from the body of the rim base toward the center of the wheel and adapted to engage beneath the abutting end of the rim base. The other end of the rim base is provided with a similar lip 14 adapted to engage beneath the end of the rim base carrying the lip 13. These lips preferably each extend about halfway across the rim, as indicated in Figs. 4, 8 and 10.

When the rim is fitted with a tire and the parts thereof are in their normal operative positions, the tire-retaining flanges 4 are mounted upon the rim base, which is expanded into close engagement therewith, with its ends abutting, as shown in Fig. 8. The rim carrying the tire may then be secured upon the wheel in any desired manner. To detach a tire from the rim, the latter is first removed from the wheel and the tire deflated. The feet of the tire are then pressed together near the point where the rim base is split and one of the flanges 4 moved in, as indicated in dotted lines in Fig. 8. The ends of the rim base may now be slid past each other laterally, as shown in the same figure, which will permit the narrow lip 13 at one end of the rim base to be cleared by the opposite end of the rim base, thus allowing the latter to be depressed and telescoped by the end of the rim base carrying the lip 13. The rim base may now be contracted and freed from the flanges 4 and the tire. In assembling the parts, the reverse procedure is followed, that is, the collapsed rim base is placed within the tire and the flanges 4 and expanded into the position shown in Fig. 8, and its ends moved laterally by each other until brought into alinement, when one end will be supported by the lip 14 and the other end by the lip 13. The coöperation of the two lips 13 and 14 with the opposite ends of the rim base prevent either end of the latter from being depressed, and the flanges 4 and the tire prevent expansion of the split band under the influence of centrifugal force. When the tire is inflated the pressure of its beads holds the flanges 4 in engagement with the flanges 5 at the edges of the rim base and prevents the ends of the latter from moving out of alinement. The ends of the split rim base are thus effectually secured in position. The lips 13 and 14 need not be of unequal width, as shown, but at least one of them should be quite narrow in order to avoid the necessity for too great lateral movement of the ends of the rim base.

In Figs. 13 and 14 I have shown a modified form of tire-carrying rim in which the rim base 15 is split along a serrated line 16, the split being at an angle to a radius, as indicated in Fig. 14. In place of the lips 13 and 14 formed upon the opposite ends of the rim base, I secure to the under-surface of one end of the latter a plate 17, the edge of which projects partly or wholly under the serrations on that end of the rim base, so as to support the projecting portions or teeth upon the other end of the rim base when the ends of the latter are brought into alinement. When the ends of the rim base are moved out of alinement, as in the form of rim previously described and as indicated in Fig. 8, it will be obvious that the teeth on one end of the rim base will disengage the plate 17, permitting that end of the rim base to be depressed and the rim base collapsed and freed from the flanges and tire. When the ends of the rim base are in alinement, the end carrying the plate 17 cannot be depressed, owing to the inclination of the cut, as shown in Fig. 14. With the rim base cut on a serrated line, portions of which are perpendicular to the edges of the rim, there is no tendency for the ends of the rim base to slide laterally by each other, such as would be the case where the rim was split on a diagonal line, as shown in Fig. 8. This tendency I do not, however, find of much practical importance, and the rim shown in Fig. 8, which I consider my preferred construction, operates in a satisfactory manner.

In Figs. 15 and 16 I have shown my invention as embodied in a one-piece clencher rim 18, having, instead of the endless tire-retaining rings or flanges 4, integral tire-retaining flanges 19. The entire rim, including the flanges, is cut transversely along a diagonal line 20, the plane of the cut being oblique to a radius, as indicated in Fig. 16. A plate 21 is secured to the under-surface of one end of the rim and projects slightly so as to support the other end of the rim when the ends are brought into alinement. The inclination of the cut 20 prevents the depression of the end of the rim carrying the plate 21, as in the form of my invention shown in Figs. 13 and 14. As will be obvious, instead of forming this cut on such an incline, each end of the rim may be provided with a plate corresponding to the plate 21 extending part way across the rim; or integral lips, similar to the lips 13 and 14 shown in Figs. 8 and 10, may be provided upon the opposite ends of the rim. The beads of the tire will be pressed firmly within the clenches 19 when the tire is inflated and will effectually prevent the accidental lateral displacement of the ends of the rim.

I have shown in Figs. 5, 6, 7 and 9 improved means for securing the tire-carrying rim upon the wheel. These means may advantageously be used with any of the forms of tire-carrying rim illustrated herein, but I do not wish to limit myself to the use of these securing means with my improved form of tire-carrying rim, as other means for accomplishing the same purpose may be substituted therefor. Neither do I wish to limit that part of my invention relating to the improved securing means to use only with the improved form or forms of tire-carrying rim shown, as these improvements in securing means are of general application. Referring now particularly to the drawings, the felly 22 of the wheel is provided with a felly band 23 permanently secured thereto by shrinking, or in any other suitable manner. This felly band is provided at one edge with a raised flange having an inclined bearing surface 24, and at the other edge with a beveled bearing surface 25. The tire-carrying rim is provided with a pair of oppositely inclined internal bearing surfaces 26 and 27 which may be formed upon some integral part of the tire-carrying rim, though they are preferably formed upon a band 28 permanently secured to the under-surface of the rim base. The bearing surface 26 engages and is supported by the bearing surface 24 upon the felly band, while the bearing surface 27 is engaged and supported by the inclined surfaces 29 of a plurality of wedges 30. Any suitable number of wedges 30 may be employed, these wedges each having an internally threaded opening through the body portion thereof and screwing upon an externally and internally threaded nut or sleeve 31. Each sleeve 31 is provided with a head 32 of suitable form for engagement by a wrench or other means for rotating the same and screws upon the projecting threaded end 33 of a bolt 34 passing transversely through the felly. These bolts are secured to the felly by means of nuts 35 and washers 36, or in any other suitable manner. These bolts are each preferably provided with beveled collars 37 of square or other angular shape, adapted to engage the walls of similarly shaped openings 38 in washers 39. The bolts thus secure the washers to the face of the felly, while the washers, being held from rotation upon the latter, as will be hereinafter described, prevent the rotation of the bolts 34. The washers may be additionally secured to the felly and prevented from rotation thereon by means of screws passing through holes 40 therein. The washers are also provided at their outer edges with inwardly turned flanges 41 adapted to fit over the beveled surface 25 of the felly band, which engagement thus further prevents the rotation of the washers. The outer surfaces of the flanges 41 preferably lie in the surface of a cylinder concentric with the axis of rotation of the wheel and serve to support the wedge portions of the members 30 and to guide the same into operative position between the felly band and rim. Each washer 39 is also provided with a projecting flange 42 adapted to be engaged by a shoulder 43 formed upon each wedge member when the wedge members are rotated to operative position, as shown in full lines in Fig. 9, the lug or flange 42 being engaged by a second shoulder 44, also formed on each wedge member, when the wedge members are rotated to inoperative position, as shown in dotted lines in Fig. 9.

The operation of this locking device is as follows: Supposing the rim to be locked upon the wheel, the parts of the locking device being in position as shown in Fig. 5, the nut or sleeve 31 will be rotated in such a direction as to screw along the bolt portion 33 in a direction away from the felly. The external thread upon the nut or sleeve 31 is given a pitch opposite to that of the bolt portion 33, so that this rotation of the nut or sleeve 31 will cause the wedge member 30 to move along the sleeve 31 in the direction of the head 32 thereof. The wedge member 30 will thus have a combined movement equal to the sum of the pitch distances of the two threads for each revolution of the sleeve or nut. When the wedge member has been drawn out sufficiently so that its end clears the washer 39, it will rotate with the nut or sleeve 31 in the direction indicated by the arrow in Fig. 9, into the position shown in dotted lines in that figure, where it will be stopped by the engagement of its shoulder 44 with the under-side of the lug 42. When each of the wedges has been moved to this position the rim is free to be removed from the wheel. To return the wedge member to operative position, it is simply necessary to rotate the nut or sleeve 31 in the opposite direction, which will first carry the wedge member back to upright position, where it will be stopped by the engagement of the shoulder 43 with the upper edge of the lug 42. Further rotation of the nut or sleeve 31 will cause the wedge to move inward, guided first by the engagement of the shoulder 43 with the lug 42, and then by the engagement of the under-surface of the wedge member with the outer-surface of the flange 41 on the washer 39. The wedging surface 29 of the wedge member will finally engage with the surface 27 on the rim, the wedge member being supported by the outer-surface of the flange 41 and by the beveled surface 25 on the felly band.

The locking means above described are a modification of the means described and claimed broadly in my Patent Number 1,103,637, granted July 14, 1914, and more particularly of the form of the invention shown in Figs. 12 to 16 of that patent.

Having thus described my invention, I claim:

1. A transversely split demountable rim for vehicle wheels having its ends provided with rigidly mounted complemental members for interlocking said ends against relative radial movement in both directions, said members being engaged and disengaged by relative movement of the rim ends.

2. A transversely split demountable rim for vehicle wheels having rigidly mounted members engageable and disengageable by a relative lateral movement of the rim ends for interlocking said ends against relative radial movement in either direction.

3. A tire-carrying rim for resilient tires comprising a ring carrying tire engaging means and transversely split on a line oblique to the sides of the ring, one end of said ring carrying a narrow lip projecting under the other end thereof, and means for preventing the inward radial movement of the end of said ring carrying said lip, said means comprising a portion of the other end of the ring projecting beneath a portion of the end of said ring provided with the lip.

4. A tire-carrying rim for resilient tires comprising a ring carrying tire-engaging means and transversely split on a line oblique to the sides of the ring, one end of said ring carrying a narrow lip projecting under the other end thereof, and means for preventing the inward radial movement of the end of said ring carrying said lip, said means comprising a second lip projecting from the opposite end of said ring.

5. A tire-carrying rim for resilient tires comprising a transversely split ring carrying tire engaging means, each end of said ring having a portion projecting beneath the opposite end thereof.

6. A tire-carrying rim for resilient tires comprising a ring carrying tire engaging means and transversely split in a direction oblique to the sides of the ring, each end of the ring having offset inwardly therefrom a lip adapted to project under the opposite end of the ring.

7. A tire-carrying rim for resilient tires comprising a transversely split ring, the ends of which carry interlocking means adapted to be engaged and disengaged by the relative lateral movement of said ends, and endless tire engaging flanges mounted on said ring.

8. A tire-carrying rim for resilient tires comprising a split ring carrying tire-engaging means, and interlocking means for the ends of said ring to prevent radial movement thereof comprising a projection on each end, the projection at one end lying beneath the non-projecting portion of the other end, and the projection of said other end underlying the non-projecting portion of the first mentioned end.

9. A tire-carrying rim for resilient tires comprising a split ring carrying tire-engaging means, and interlocking means for the ends of said ring to prevent radial movement thereof comprising a projection on one of said ends extending to one side of the center of the ring, and a second projection on the other end of the ring extending in an opposite direction to the first-mentioned projection and to the side of the center of the ring, said projections being adapted to underlie corresponding non-projecting portions of the ends of the ring.

10. A tire-carrying rim for resilient tires comprising a split ring carrying tire-engaging means, and interlocking means for the ends of said ring to prevent radial movement thereof comprising a projection on one of said ends extending to one side of the center of the ring, and a second projection on the other end of the ring extending in an opposite direction to the first mentioned projection and to the other side of the center of the ring, said second projection being narrower than the first mentioned projection, said projections being adapted to underlie the corresponding non-projecting portions of the ends of the ring.

JAMES H. WAGENHORST.

Witnesses:
SEWARD DAVIS,
EDMUND GRIMLEY MORRIS.